United States Patent
Okano

[11] B 3,988,046
[45] Oct. 26, 1976

[54] RESILIENTLY MOUNTED GAS BEARING DEVICE

[75] Inventor: Hiroshi Okano, Susono, Japan

[73] Assignee: Toyota Jidosha Kogyo Kabushiki Kaisha, Toyota, Japan

[22] Filed: Aug. 27, 1973

[21] Appl. No.: 391,797

[44] Published under the second Trial Voluntary Protest Program on March 9, 1976 as document No. B 391,797.

[30] Foreign Application Priority Data
Apr. 5, 1973  Japan.................. 48-39198

[52] U.S. Cl..................... 308/9; 308/73; 308/121
[51] Int. Cl.².............. F16C 17/06; F16C 19/04; F16C 23/04; F16C 35/02
[58] Field of Search ............ 308/73, 160, 121, 9

[56] References Cited
UNITED STATES PATENTS

| | | | |
|---|---|---|---|
| 3,063,762 | 11/1962 | Hirtz | 308/73 |
| 3,202,464 | 8/1965 | Chaboseau et al. | 308/73 |
| 3,791,703 | 2/1974 | Ifield | 308/73 |
| 3,804,472 | 4/1974 | Schuller et al. | 308/73 |
| 3,830,552 | 8/1974 | Schuller et al. | 308/121 |

Primary Examiner—Robert J. Spar
Assistant Examiner—Howard Beltran
Attorney, Agent, or Firm—Stevens, Davis, Miller & Mosher

[57] ABSTRACT

A plurality of arcuate bearing pads are disposed concentrically around a revolving shaft, with at least one of the bearing pads being movably supported in the radial direction of the shaft. At least one of the bearing pads is arranged such that it is supported with a relatively weak spring against its slow displacement caused by thermal expansion of the shaft but is supported by a dynamic pressure gas damper against a displacement caused by rapid displacement of the shaft due to an external force exerted thereon.

7 Claims, 6 Drawing Figures

RESILIENTLY MOUNTED GAS BEARING DEVICE

BACKGROUND OF THE INVENTION

1. Field of the Invention

This invention relates to a dynamic pressure utilizing gas bearing device whereby the shaft rotating at high speed is rotatably supported in a levitated state by the action of a gas film or layer.

2. Description of the Prior Art

The conventional dynamic pressure type gas bearing devices had problems in that excess pressure would be loaded to the bearing pads or the shaft and bearing pads would be overheated to cause seizure when the gas layer thickness is decreased with thermal expansion of the shaft. The present invention is envisaged to overcome such problems by the combined use of spring and gas supports.

A typical example of the conventional dynamic pressure type gas bearing mechanism is shown in FIG. 1. The bearing mechanism shown in FIG. 1 includes three plate-shaped bearing pads 2a, 2b and 2c arranged equidistantly from each other around a shaft 1. These bearing pads have a slightly larger radius of curvature than the shaft 1 and all have the same thickness, with their outer peripheral faces being supported by balls 3a, 3b, 3c carried at the ends of pivots 7a, 7b, 7c, respectively. The pivots 7b and 7c are each screwed into a bearing support block 5 and, after positional adjustment, locked in position by a lock nut 8. The pivot 7a supporting the bearing pad 2a positioned upwardly of the shaft 1 is so adjusted positionally as to provide a predetermined amount of clearance $a$ between the shaft 1 and the bearing pad 2a, and then is fixed to a fixing portion 4a at one end of a leaf spring 4 by means of a lock nut 8. Leaf spring 4 is secured at its other fixing portion 4b to a bearing support 5 by a bolt 6.

In FIG. 1, when the shaft 1 is rotated in the direction of arrow A, the viscosity of the ambient gas causes it to be forced between the bearing pads 2a, 2b, 2c and the external surface of the shaft 1; consequently, a gaseous film or layer having a higher pressure than the ambient gas is formed between the external surface of the shaft 1 and the internal faces of the bearing pads 2a, 2b, 2c by the wedging action of the sucked-in gas. As three or more bearing pads are arranged equidistantly from each other around the outer periphery of the shaft 1, the shaft 1, when rotated at a high speed, is lifted up by the action of combined pressure of the gaseous film formed between the inner surfaces of the respective bearing pads 2a, 2b, 2c and the opposed outer surface of the shaft 1. At this time, the center of rotation of the shaft 1 is located at a position slightly lower (by a distance equal to the amount of descent of the shaft due to its own weight) than the geometrical center of the bearing pads. It is also known that the smaller the value of clearance $a$, the greater the pressure of the gaseous film.

However, such conventional dynamic pressure type gas bearing mechanisms present various problems, such as mentioned below, when high-frequency vibration is imparted thereto due to exposure to external vibratory forces or unbalance remaining in the revolving shaft 1 and other rotating members mounted on the shaft 1. For instance, when dynamic pressure type gas bearing unit of the above-described type is used in a high heat generating engine, such as a gas turbine engine, the shaft 1 could be very quickly heated due to quick variation of load. At such a time, if the outer diameter of the shaft 1 is expanded by the elevated heat, the clearance $a$ is correspondingly reduced to cause a rise of pressure of the gaseous film between the shaft 1 and bearing pads 2a, 2b, 2c, with the result that pads 2a, 2b, 2c are forced outwardly by such elevated pressure of the gaseous film. The bearing pads 2b and 2c cannot move in the outward direction as they are held by the pivots 7b and 7c secured to their respective bearing support blocks 5. But, the bearing pad 2a positioned upwardly of the shaft 1 is permitted to move outwardly surmounting the resisting force of the leaf spring 4 as the external face of pad 2a is supported by a pivot 7a which is secured to leaf spring 4. However, the leaf spring 4 has a large spring constant so as to inhibit the shaft 1 from moving to any excess degree when a sharp impact force is exerted on the shaft 1. Therefore any rise in pressure of the gaseous film cannot produce any appreciable degree of displacement of the leaf spring or bearing pad 2a, so that the clearance $a$ remains small. Consequently, as the pressure of the gaseous film is raised, the bearing pads receive an excessive pressing force from the respective pivots 7a, 7b, 7c. Further, if thermal expansion of the shaft is excessively large, the gaseous film may become unable to withhold the pressing force of the leaf spring 4, causing seizure of the shaft and bearing pads. Also, when high frequency vibration is imparted to the bearing unit owing to an application of an external vibratory force or to unbalance remaining in the shaft and other rotating members mounted on said shaft, although the bearing unit still possesses a relatively high shaft supporting force, no satisfactory vibration attenuating effect is provided because internal friction of the leaf spring 4 is the only element that can act to attenuate vibration.

SUMMARY OF THE INVENTION

The present invention has for its object to eliminate the various problems, such as above mentioned, inherent in conventional dynamic pressure type gas bearing devices. More particularly, it is intended to provide an improved bearing mechanism of the type referred to, whereby the defects of the conventional devices are removed by supporting the bearing pads with the combined use of spring means having a small spring constant and gas supporting means having a strong spring action and high vibration attenuating effect against quick displacement but having almost no spring action and vibration attenuating effect for slow-going displacement.

DESCRIPTION OF THE PREFERRED EMBODIMENTS

Figure 1:
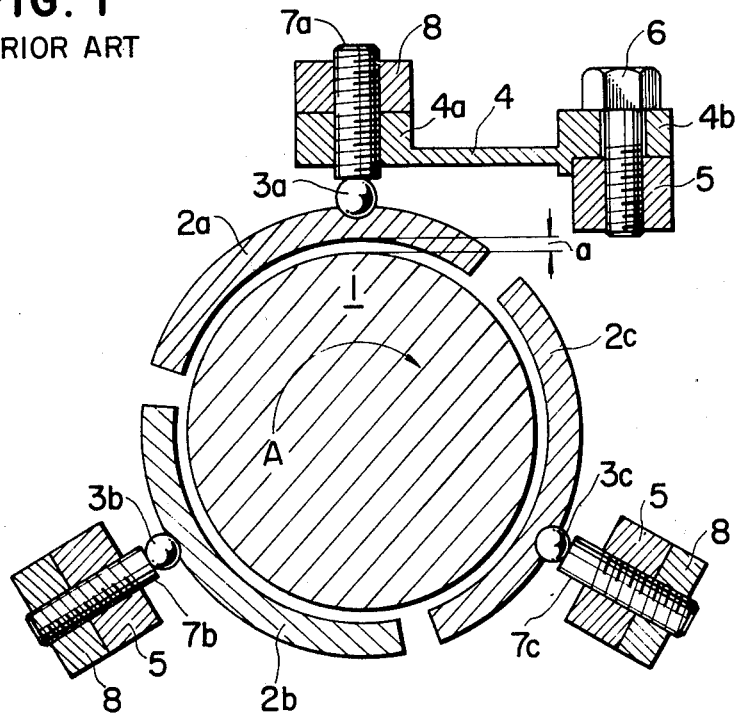
FIG. 1 is a sectional view showing a conventional dynamic pressure type gas bearing mechanism.
Figure 2:
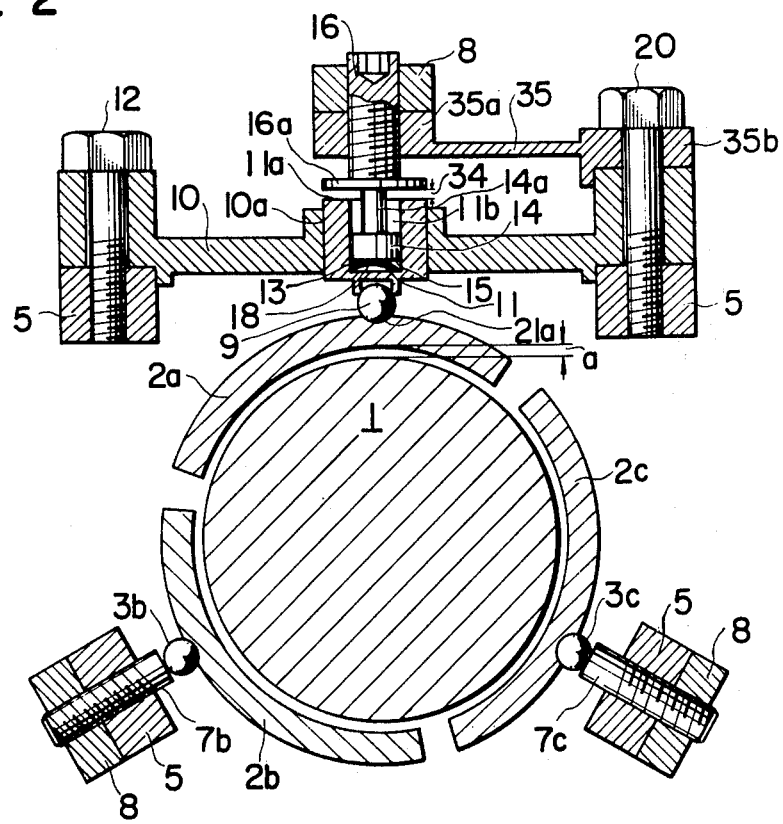
FIG. 2 is a sectional view showing a first embodiment of the dynamic pressure type gas bearing system according to the present invention.

Referring first to FIG. 2 showing a first embodiment of the present invention, it will be seen that three bearing pads 2a, 2b and 2c are arranged equidistantly from each other around a shaft 1 which is rotated at a high speed. These bearing pads all have the same thickness and have a slightly larger radius of curvature than the shaft 1. Their external faces are supported by balls 9, 3b and 3c carried at the ends of pivots 11, 7b and 7c, respectively. The pivots 7b and 7c are each screwed into a bearing support block 5 and, after positional adjustment, locked in position by a lock nut 8. The basic arrangement is essentially the same as that of the conventional bearing device of the previously recited type.

In the first embodiment of the present invention, the bearing pad 2a located upwardly of the shaft 1 is supported with its spherical seat 21a pressed against the ball 9 secured to the end of the pivot 11 by welding, soldering or other suitable means. Pivot 11 is slidably fitted within a sliding face 10a of a pivot guide plate 10 secured to the bearing support block 5 by bolts 20 and 12. A cylindrical hole or recess 11b is formed in pivot 11 and piston 14 is slidably fitted in recess 11b. Piston 14 has at its top an integral columnar portion 14a which abuts at its upperside against a check plate 16a integrally formed with an adjusting screw 16. A suitable clearance 34 is maintained between plate 16a and the top planar surface 11a of the pivot 11 when the shaft 1 is revolving. Defined by the inner wall of the recess 11b, in the pivot 11 and the underside of the piston 14 is a space 15 in which a belleville spring 13 is provided to regulate upward movement of the pivot 11. The adjusting screw 16 is screwed into a central fixing portion 35a of a leaf spring 35 and locked in position by a lock nut 8. The fixing portion 35b at the other end of leaf spring 35 is fastened, together with the pivot guide plate 10, to a bearing support block 5 by a bolt 20.

Figure 4:
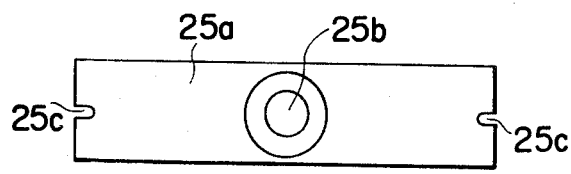
FIG. 4 is a plan veiw of a pivot used in the second embodiment shown in FIG. 3.
Figure 3:
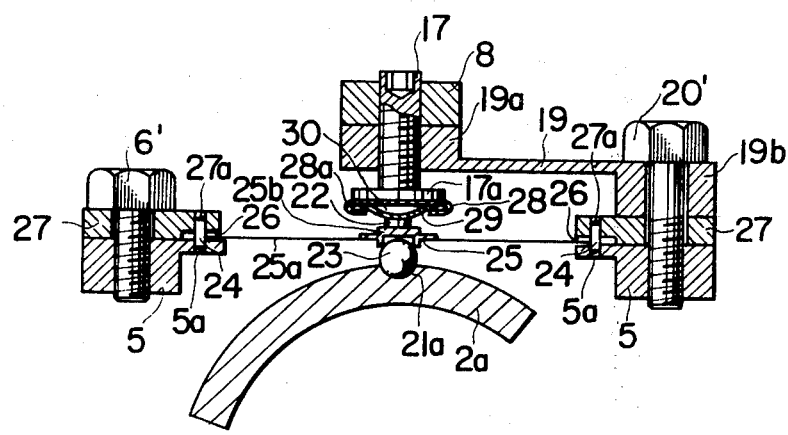
FIG. 3 is a sectional view showing a second embodiment thereof.

Referring now to FIGS. 3 and 4, there is shown a second embodiment of the present invention. In order to simplify the drawings, the shaft 1 and bearing pads 2b and 2c, which are identical with those used in the conventional bearing device and in the foregoing embodiment, are omitted. The bearing pad 2a positioned upwardly of the shaft is movably contacted through its spherical seat 21a against a ball 23 which is welded or soldered to a contact seat 25b of a pivot 25. Pivot 25 consists of contact seat 25b and a thin pivot plate 25a welded or soldered to seat 25b.

As shown in plan view in FIG. 4, pivot plate 25a is rectangular in its general configuration and is formed with slits 25c at both ends thereof. Slits 25c fit with corresponding pins 24 located in holes 5a in the respective bearing support blocks 5. Pins 24 act as reference points to locate the pivot 25 in its front-to-back and right-to-left directions. The top of each pin 24 fits into a hole 27a formed in a spacer 27 which is fastened to the associated bearing support block 5 by means of bolts 6' and 20'. Each spacer 27 is provided with a cut-away space 26 at a part between it and the associated support block 5 where the pivot plate 25a is to be inserted.

The contact seat 25b of the pivot 25 is in contact with a holder plate 22. Adjusting screw 17 has at its end an integral disc-like portion 17a; a spring holder 28 is welded or soldered to the underside of disc portion 17a. A belleville spring 29 is supported by a claw 28a of spring holder 28 and is also welded or soldered to a holder plate 22. Between spring 29 and spring holder 28 is formed a space 30. Thus, when the adjusting screw 17 is turned for clearance adjustment, disc portion 17a, spring holder 28, belleville spring 29 and holder plate 22 are caused to make corresponding vertical movements with each turn of the adjusting screw 17.

Adjusting screw 17 is secured to the central fixing portion 19a of a leaf spring 19 by a lock nut 8. The other fixing portion of leaf spring 19 is fastened, along with a spacer 27, to the associated bearing support block 5 by a bolt 20'.

Figure 5:
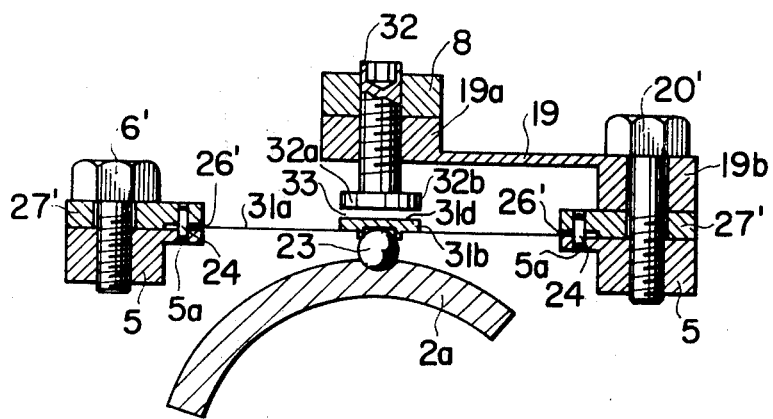
FIG. 5 is a sectional view showing a third embodiment of the present invention.
Figure 6:
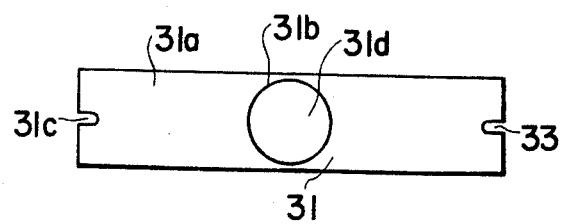
FIG. 6 is a plan view of a pivot used in the third embodiment shown in FIG. 5.

FIGS. 5 and 6 show a third embodiment of the present invention. Again, shaft 1 and bearing pads 2b and 2c, similar to those already discussed or of common usage, are not shown. This embodiment differs from the second embodiment of FIG. 3 in the construction of the pivots and in the end construction of the adjusting screw. That is, in the third embodiment, the pivot 31 consists of a thin plate 31a having a spring action and a central pivot boss 31b. As shown in a plan view in FIG. 6, the pivot plate 31a is rectangular in general configuration and is provided with slits 31c at both ends. As in the second embodiment, a ball 23 supporting the bearing pad 2a is welded or soldered to the pivot boss 31b of the pivot 31. The pivot 31 is also fixed in its front-to-back and right-to-left location by engagement of pins 24 with corresponding slits 31c at both ends of the pivot plate 31a. Each spacer 27', as in the case of the spacer 27 in the second embodiment, is formed with a slit 26' at the location where the pivot plate is to be inserted. However, in the instant embodiment, slit 26' is formed only slightly larger than the thickness of the pivot plate 31a. This substantially inhibits vertical movement of both ends of the pivot plate 31a but allows sliding movement of the plate toward the center. The pivot boss 31b has at its top a flat plane 31d. Adjusting screw 32 is provided with an integral disc-like portion 32a at its lower end which has on its underside a flat plane 32b. The position of adjusting screw 32 is adjusted to form a suitable clearance 33 between the plane 31d of pivot boss 31b and the opposed plane 32b on the underside of disclike portion 32a. Screw 32 is fixed to a leaf spring 19 by a lock nut 8.

The above-described dynamic pressure type gas bearing mechanism of the present invention operates as follows.

In the first embodiment shown in FIG. 2, when the shaft 1 is rotated, it is supported by a gaseous film or layer formed between the bearing pads 2a, 2b, 2c and the external surface of the shaft 1, on the same principle as in the conventional bearing units of this type. As the bearing pads 2b and 2c have their outer peripheral faces supported by balls 3b and 3c welded or soldered to pivots 7b and 7c fixed to the respective bearing support blocks 5, their supported points won't be changed during operation. On the other hand, the outer peripheral face of the bearing pad 2a is supported by a ball 9 welded or soldered to the pivot 11 which is slidably fitted within the sliding face 10a of pivot guide plate 10, so that bearing pad 2a is movable in the vertical direction. That is, when the shaft 1 is heated and expanded, although the two bearing pads 2b and 2c on the lower side stay at their fixed positions, the bearing pad 2a on the upper side can move upwardly pushing up the pivot 11 with an increase in pressure of the gaseous film between the inner peripheral surface of the pad and the outer peripheral surface of the shaft 1. Pivot 11 can further move upwardly against the resisting force of the belleville spring 13 until the plane 11a on the upperside of the pivot comes to abut against the check plate 16a. In this case, since movement of pivot 11 and hence movement of the bearing pad 2a is very slow, the gases in the space 15 in the hole 11b and in the space 18 between the belleville spring 13 and the bottom face of hole 11b can leak out through an opening between the inner face of hole 11b and piston 14 and an opening between the outer face of spring 13 and the bottom face of hole 11b, so that such gases produce no obstacle to movement of pivot 11 and hence movement of the bearing pad 2a. However, when high frequency vibration is imparted to the shaft due to unbalance in the shaft or other causes, or when the shaft undergoes a sharp displacement for some reason or other, the bearing pad 2a is urged to make sudden, sharp movements with the pivot 11. In such a case, since the gases in spaces 15 and 18 are sharply compressed they can work just like a spring of the type having a strong spring constant and particularly a most desirable variable spring constant. Also, as the lower part of the shaft is supported by the pivot in a conventional way, a strong support is provided sufficient to counteract any high frequency vibration or sharp displacement of the shaft. In this way, it is possible to prevent vibration or sharp displacement of the shaft 1. Further, as leakage of gas in the area of contact between the inner face of the hollow 11b and the piston 14 or between the outer face of the belleville spring 13 and the bottom face of hollow 11b provides an extremely high resistance to movement of the pivot 11, a sufficiently high vibration attenuating effect can be obtained. Frictional resistance in said contact areas or on the sliding face 10a of the pivot guide plate 10 also provides an additional vibration attenuating effect. Thus, the bearing mechanism of the present invention produces an excellent result in holding down high frequency vibration or sharp displacement of the shaft as well as providing a high vibration attenuating effect.

In the sound embodiment shown in FIGS. 3 and 4, belleville spring 29 corresponds to the belleville spring 13 in the first embodiment and space 30 between the belleville spring 29 and the spring holder 28 corresponds to the spaces 15 and 18 in the first embodiment. As in the first embodiment, when the shaft 1 is expanded by heat, the bearing pad 2a is pushed up with a rise in pressure of the gaseous layer; upward movement of the bearing pad causes a corresponding movement of the pivot 25. Since the pivot plate 25a of the pivot 25 is vertically movably supported at its both ends fitted in respective slits 26, pivot 25 is allowed to move upwardly against the opposed elastic force of the belleville spring 29. Thus, the bearing pad 2a is able to move upwardly within the possible range of deformation of the belleville spring 29 corresponding to thermal expansion of the shaft 1. In this case, too, movement of the pivot 25 and hence movement of the bearing pad 2a is very slow-going, so that the gas trapped in the space 30 between the belleville spring 29 and spring holder 28 can easily leak out through an opening in the area of contact between the belleville spring 29 and spring holder 28. Therefore, such gas offers no resistance to movement of the pivot 25 and hence of the bearing pad 2a.

However, when high frequency vibration is imparted to the shaft owing to unbalance in the shafting or other causes, or when the shaft undergoes a quick displacement for some reason or other, the bearing pad 2a is also urged to make quick movements along with the pivot 25. In such a case, the gas in the space 30 is sharply compressed to work as a spring having a strong and variable spring constant most desirable for a spring of this kind. Also, since the lower part of the shaft 1 is supported by a pivot in a conventional way, there is obtained a strong support sufficient to counteract any high frequency or sharp displacement of the shaft. It is thus possible to prevent vibration or sharp displacement of the shaft 1. Further, leakage of gas from the area of contact between the belleville spring 29 and spring holder 28 provides an extremely strong resistance to movement of the pivot 25, thus producing a high vibration attenuating effect. Although this embodiment cannot achieve as high vibration attenuating effect by frictional force as in the first embodiment, it has, on the other hand, the merit that the pivot assembly can be reduced in size and weight.

In a third embodiment of the present invention shown in FIGS. 5 and 6, as in the foregoing first and second embodiments, the bearing pad 2a is urged to push up the pivot 31 when the shaft 1 is expanded by heat. As the pivot plate 31a of pivot 31 is inwardly slidably supported at its both ends, the pivot plate 31a can flex upwardly. The spring effect provided by such flexure is the same as the spring action of the belleville springs 13 and 29 in the first and second embodiments. When the shaft 1 undergoes high frequency vibration or sharp displacement, the gas in the clearance 33 is sharply compressed to work as a spring having a strong spring constant, thereby to prevent such vibration or sharp displacement on the shaft. A high vibration attenuating effect is also provided by the resistive force created when the gas in the clearance 33 leaks out into the surrounding. This embodiment allows further simplification of the mechanism as compared with the second embodiment.

In each of the embodiments discussed above, pivot movement is possible within a certain limited range — from a point where the pivot starts moving against the force of the weak spring 13, 29 or 31a to a point where the pivot abuts against the adjusting screw. After that, the leaf spring 35 or 19 acts to provide a relatively rigid elastic support. Smooth operation of the dynamic pressure type gas bearing unit at high temperature can be accomplished by determining the temperature around the bearing, shaft temperature, and maximum amount of pivot movement.

As described above in detail, the dynamic pressure type gas bearing device according to the present invention is arranged to allow positional displacement of a bearing pad or pads corresponding to thermal expansion of the shaft, so that it is possible to keep the bearing pads from receiving an excessive abrasive force with a rise in pressure of the gaseous layer and to also prevent seizure caused by contact of such bearing pads with the shaft. The present bearing mechanism is also capable of substantially absorbing or attenuating high frequency vibration or sharp displacement of the shaft. In the second and third embodiments, as compared with the first embodiment, the pivot assembly can be reduced in weight and size to allow greater versatility in construction of the mechanism. Further, in the third embodiment, the spring constant of the thin pivot plate 31a having a spring action can be set relatively easily over a wide range, and also such pivot plate can be manufactured with ease. Moreover, in case the shaft 1 is elevated to a higher temperature than the surrounding bearing members, the heat of the shaft is allowed to transmit only through the thin pivot plate 31a, so that a high thermal resistance is created to hinder heat transfer to the parts where heat is unwanted.

What is claimed is:

1. In a dynamic pressure gas bearing assembly for rotatably supporting a shaft having a plurality of bearing pads for supporting the shaft about the circumference thereof by means of a fluid layer between the shaft and the bearing pads during rotation of the shaft, the improvement comprising:

means for mounting one of said bearing pads and allowing movement of the pad toward and away from said shaft, said mounting means comprising:

resilient means having a relatively small spring constant and being deformable by relatively slow movement of said mounting means due to relatively slow buildup of fluid pressure between the shaft and said one bearing pad in order to absorb relatively small vibration or thermal expansion of said shaft, a resilient member having a relatively large spring constant fixed to a support base in mechanical series relation with said resilient means and deformable by relatively high amplitude displacement of said mounting means in order to absorb shocks due to large forces on said shaft, and vibration attenuating means for preventing movement of said one bearing pad away from the shaft in response to rapid increase in fluid pressure between the pad and the shaft that is substantially faster than the relatively slow increase in pressure due to relatively high frequency displacements of the shaft.

2. The bearing according to claim 1, wherein said mounting means comprises a support member mounting said bearing pad; and means forming a pressure chamber coupled between said resilient member and said support member, said pressure chamber having an opening therein through which a fluid medium can pass slowly under relatively low pressure but cannot pass rapidly under a substantially higher pressure than said low pressure.

3. The bearing according to claim 2, wherein said support member comprises a further resilient member mounted for movement with said bearing pad, said pressure chamber forming means comprising a plate mounted on the first resilient member and a compression spring coupled to said plate, said spring and plate forming a hollow therebetween defining said pressure chamber, said further resilient member and said compression spring being fixedly coupled to each other.

4. The bearing according to claim 2, wherein said support member comprises a member mounted for movement with said bearing pad and having a piston cylinder formed therein, and further comprising a piston coupled to said resilient member and mounted for movement in said piston cylinder, said piston and cylinder together defining said pressure chamber.

5. The bearing according to claim 4, further comprising a cover member fixedly coupled to said piston for closing the end portion of said cylinder through which said piston enters said cylinder at a predetermined limit of travel of said support member.

6. The bearing according to claim 5, further comprising a compression spring mounted at the inner end portion of said cylinder for biasing said piston.

7. The bearing according to claim 1, wherein said mounting means comprises a first resilient member fixed to a support base; an adjustable plate mounted on said first resilient member for adjustment in the direction of movement of said at least one bearing pad; and a second resilient member mounted on said support base, said second resilient member mounting said bearing pad for movement therewith toward and into contact with said plate.

* * * * *